(12) United States Patent
Sano

(10) Patent No.: US 6,849,110 B2
(45) Date of Patent: Feb. 1, 2005

(54) INK COMPOSITION, INK SET, AND RECORDING METHOD AND RECORDED ARTICLE USING SAME

(75) Inventor: Tsuyoshi Sano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

(21) Appl. No.: 10/259,193

(22) Filed: Sep. 27, 2002

(65) Prior Publication Data

US 2003/0106461 A1 Jun. 12, 2003

(30) Foreign Application Priority Data

Sep. 28, 2001 (JP) .................................... 2001-303311
Sep. 27, 2002 (JP) .................................... 2002-282678

(51) Int. Cl.$^7$ .............................................. C09D 11/00
(52) U.S. Cl. ................. 106/31.6; 106/31.77; 106/31.78; 106/31.27
(58) Field of Search .................. 106/31.6, 31.77, 106/31.78, 31.27; 347/100; 428/195.1

(56) References Cited

U.S. PATENT DOCUMENTS

2003/0035034 A1 * 2/2003 Fukumoto et al. ............ 347/86
2003/0056687 A1 * 3/2003 Sano .......................... 106/31.6
2003/0144377 A1 * 7/2003 Sano et al. .................. 523/160

FOREIGN PATENT DOCUMENTS

| JP | 62-1426 | 1/1987 |
| JP | 3-56573 | 3/1991 |
| JP | 3-79678 | 4/1991 |
| JP | 3-160068 | 7/1991 |
| JP | 4-18462 | 1/1992 |

* cited by examiner

Primary Examiner—Helene Klemanski
(74) Attorney, Agent, or Firm—Ladas & Parry

(57) ABSTRACT

For providing an ink composition which can reduce matamerizm while reducing the total amount of inks used when such ink composition is simultaneously used with another ink composition, and prevent reduction of the image quality, the present invention provides an ink composition wherein the difference between the maximum value and the minimum value of the reflectance of an output color through an ink jet output over a light source wavelength range of 400 to 700 nm, in which such output color satisfies formulae (1), (2) and (3) below at a spatial coordinate (L* a* b*) stipulated by CIE under the D 50 light source is not more than 20%:

(1) $45 \leq L^* \leq 55$
(2) $-10 < a^* < 10$
(3) $-10 < b^* < 10$

18 Claims, 1 Drawing Sheet

INK COMPOSITION, INK SET, AND RECORDING METHOD AND RECORDED ARTICLE USING SAME

BACKGROUND OF THE INVENTION

1. Field of the Invention

The present invention relates to an ink composition which has solved the phenomenon of a printed article (color recorded image) differing according to the light source used when viewing the printed article (metamerizm), i.e., the constant colors of the printed article can be held regardless of the light source, and which has reduced the total amount of inks used when the ink composition is simultaneously used with another ink composition.

2. Description of Prior Art

Various recording methods for forming vivid, high-quality color images have been developed in the past. In particular, an ink jet recording method forms a high-quality image through an ink jet output using an ink set including a plurality of color ink compositions such as a yellow ink, a magenta ink, a cyan ink and a black ink.

However, with these previously proposed ink sets, a printed article (color recorded image) produced by printing on a recording medium such as paper differs in color according to differences in the light source (fluorescent lamp, incandescent lamp, sunlight etc.). That is, a phenomenon (metamerism) occurs in which the colors of a printed article when viewed using one light source are different when viewed using another light source. In general, metamerism refers to the phenomenon in which two colors having different spectral distributions appear to be the same color under certain illumination conditions or the like, but appear to be different colors when the illumination conditions or the like, are changed. Here, 'illumination conditions or the like' includes not only the illumination conditions themselves, but also the temperature of the light, and the characteristics of the color vision of the viewer. Such metamerism is used in the evaluation of lighting and object colors, but metamerism with industrial products is often a problem in terms of color matching.

In a recording medium, there is a limitation on the total amount of inks which can be fired thereon per unit area (hereinafter this limitation is also referred to as 'ink duty limitation'). That is, an ink recording on a recording medium, in excess of the amount defined by the ink duty limitation, may cause ink blotting and reduce the image quality pertinent to the recording article obtained. Thus it has been impossible to raise the concentration of formed dots without limitation.

In order to ensure good printing quality, it is necessary, as described above, that the ink firing amount be within the range of the ink duty limitation. However, if the ink firing amount (i.e. the amount of inks used) is limited, the coloring ability and the color reproduction range of a recorded image are necessarily limited and it is difficult to improve the image quality, particularly in a region of low-brightness (shadow region). In order to enhance the color ability or expand the color reproduction range, the active use of an ink with high color concentration can be considered; however, the increase in the use of an ink with a high color concentration generally causes the dots of the discharged inks to be visible in a recording medium, i.e., grainy image, and thus reduced image quality.

SUMMARY OF THE INVENTION

It is thus an object of the present invention to provide an ink composition which can solve the problem of metamerizm, reduce the total amount of inks used when such ink composition is used simultaneously with another ink composition as an ink set, and prevent reduced image quality.

The present inventors carried out assiduous studies, and as a result, discovered that the above object can be obtained by an ink composition in which reflected light from an output color through an ink jet output has certain specified spectral characteristics.

Based on this discovery, the present invention provides an ink composition wherein the difference between the maximum value and minimum value of the reflectance of an output color through an ink jet output under a D50 light source over a light source wavelength range of 400 to 700 nm is not more than 20%.

Moreover, the present invention provides an ink composition as above, preferably including, at least, a yellow pigment, a magenta pigment and a cyan pigment.

Moreover, the present invention provides an ink set comprising at least an ink composition as above, in addition to a yellow ink, a magenta ink and a cyan ink.

Moreover, the present invention provides an ink cartridge containing an ink composition or an ink set as above.

Moreover, the present invention provides a recording method, comprising the step of forming an image on a recording medium using an ink composition or an ink set as above.

Moreover, the present invention provides a recorded article, comprising a recording medium having an image formed thereon using an ink composition or an ink set as above.

DESCRIPTION OF THE PREFERRED EMBODIMENTS

Figure 1:
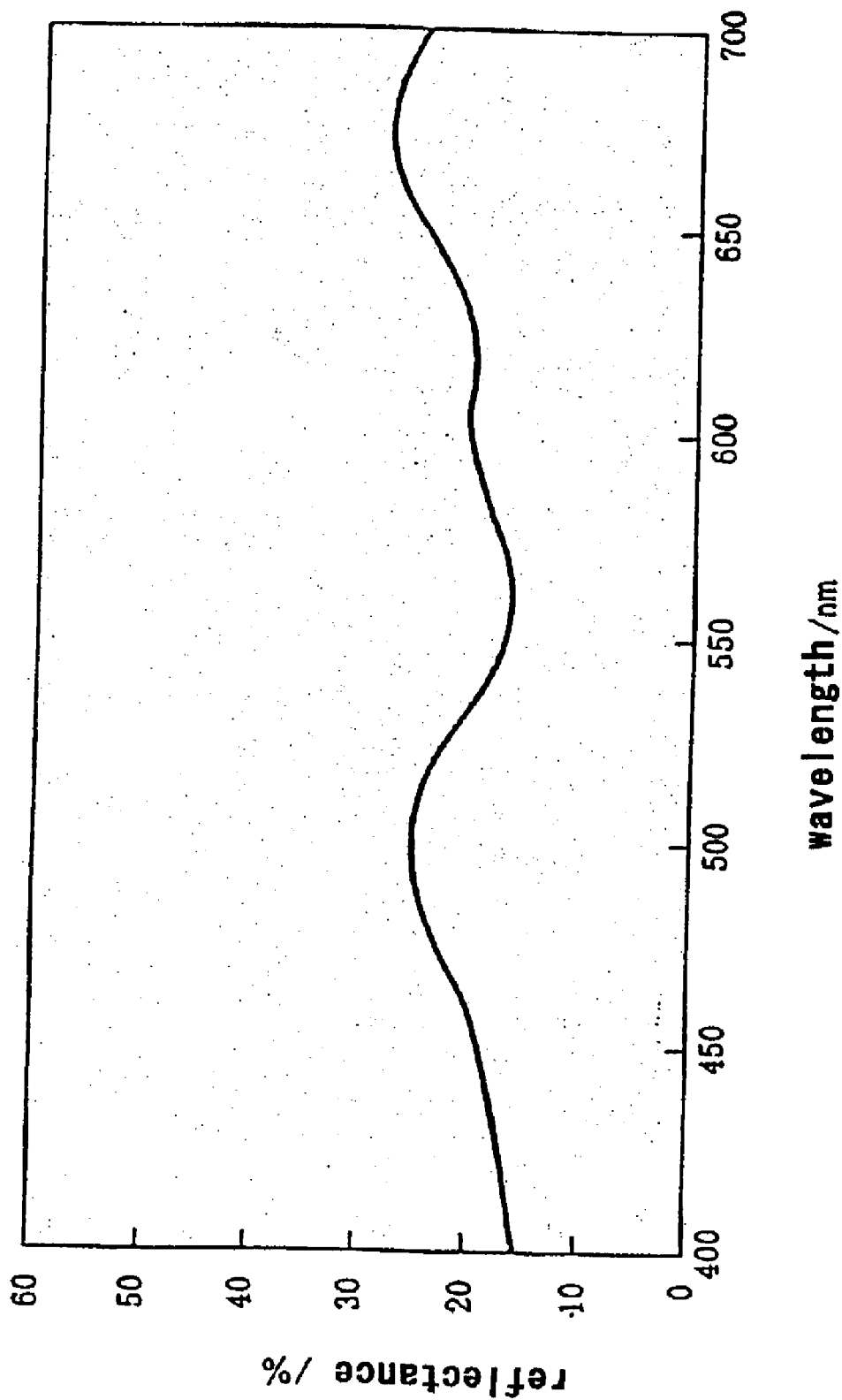
FIG. 1 is a graph showing spectral characteristics (relationship between light source wavelength and reflectance) of reflected light for a color made by outputting an ink, as one embodiment of the ink composition of the present invention, through an ink jet output.

The ink composition of the present invention will be explained in detail below with reference to preferred embodiments thereof.

The ink composition of the present invention is such that the difference between the maximum value and the minimum value of the reflectance of an output color through an ink jet output over a light source wavelength range of 400 to 700 nm, in which the output color satisfies the following formulae (1), (2) and (3) in the spatial coordinates ($L^*$, $a^*$, $b^*$) stipulated by the CIE (Commission International del'Eclairage) under a D50 light source, is not more than 20%.

(1) $45 \leq L^* \leq 55$
(2) $-10 < a^* < 10$
(3) $-10 < b^* < 10$

By adopting the above constitution, the ink composition of the present invention reduces the phenomenon of metamerizm (light source dependence), in which, regardless of if the ink composition is used solely or if a color image is printed using an ink set including the above composition with another color composition, the colors of the resulting printed article when viewed using one light source are different when viewed using another light source (hereinafter this phenomenon is simply referred to "metamerizm"); and reduces the total amount of inks used when the ink composition is simultaneously used with another ink composition as an ink set; and does not reduce the image quality.

If the difference between the maximum value and the minimum value of the reflectance of the output color exceeds 20%, then the colors of an obtained printed article differ according to the light source; therefore, the metamerizm cannot be sufficiently reduced.

It is preferable that the difference between the maximum value and the minimum value of the reflectance of the output color is, particularly, not more than 15%, since metamerizm can then be reduced more easily.

Note that, throughout this specification, 'output color' refers, for example, to the color of an image formed by outputting onto a recording medium or the like.

The ink composition of the present invention can reduce the total amount of inks used when such ink composition is simultaneously used with another ink composition.

That is, when an image is recorded as an ink set using the ink composition of the present invention, in, particyularly, a low-brightness region (shadow region), it is unnecessary to increase the ink duty of the inks to maintain the color ability and reproducibility of the recorded image, which is different from a normal ink set that includes only a yellow ink, a magenta ink and a cyan ink. Using the ink composition of the present invention enables maintenance of the color ability and reproducibility of a recorded image in, particularly, a low-brightness region even though the ink duty of another ink composition is reduced. Thus, the total amount of inks used in an ink set, including the ink composition of the present invention, can be reduced.

The 'ink duty' refers to the value D that is defined and calculated as in undermentioned formula (A).

D={Actual no. dots printed/(vertical resolution×horizontal resolution)}×100 (duty) (In this formula, 'actual no. dots printed' refers to the actual number of dots printed per unit area and 'vertical resolution' and 'horizontal resolution' refer to respective resolutions per unit area.) (A)

The formation of an output color, which satisfies the above formulae (1), (2) and (3) in the spatial coordinates (L*,a*,b*) stipulated by the CIE under a D50 light source, through an ink jet output, can be obtained by controlling the ink duty.

The ink composition of the present invention is not restrained by a color agent thereof (colorant); however, it preferably includes, at least, a yellow pigment, a magenta pigment and a cyan pigment, to improve the image quality of the recorded image.

There are no particular limitations on these pigments as far as the above reflectance of the ink composition has specified spectral characteristics (the difference between the maximum value and the minimum value is not more than 20%); however, the following is preferable for easier reduction of metamerizm.

That is, a pigment (I) represented by undermentioned formula (I) as a yellow pigment as above, a pigment (II) represented by undermentioned formula (II) as a magenta pigment as above, and a pigment (III) represented by undermentioned formula (III) as a cyan pigment as above are preferable.

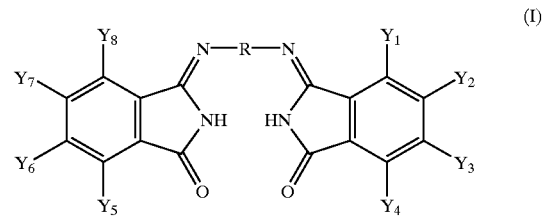

(In this formula, $Y_1$ through $Y_8$ independently show a chlorine atom or a hydrogen atom, and R shows o-phenylene or 2,6-xylyl.)

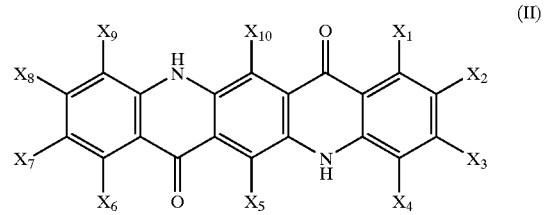

(In this formula, $X_1$ through $X_{10}$ independently show a chlorine atom, a hydrogen atom or a methyl group.)

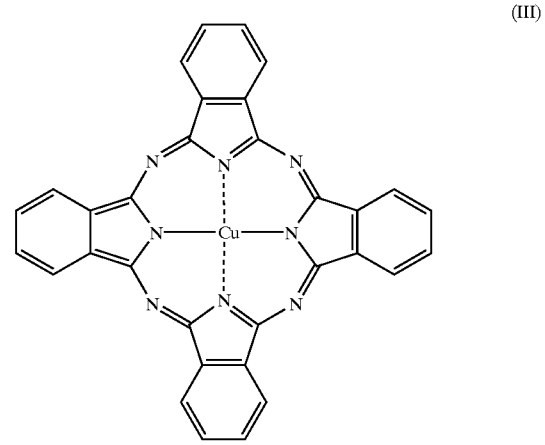

To reduce the metamerizm more easily, it is preferable to use C. I. pigment yellow 110 as the above pigment (I), C. I. pigment red 122 as the above pigment (II), and C. I. pigment blue 15:3 as the above pigment (III).

In the ink composition of the present invention, it is preferable that the content of the above yellow pigment is in a range of 0.01 to 2 wt %, and more preferably in a range of 0.1 to 1.5 wt %, the content of the above magenta pigment is in a range of 0.01 to 2 wt %, and more preferably in a range of 0.1 to 1.5 wt %, and the content of the above cyan pigment is in a range of 0.001 to 1.5 wt %, and more preferably in a range of 0.1 to 1.0 wt %.

More preferably, in order to maintain the realizability of the colors and to prevent the appearance of graininess on the recorded image, the content of the above yellow pigment is more than 1.0 wt % and no more than 1.5 wt %, the content of the above magenta pigment is more than 1.0 wt % and no more than 1.5 wt %, and the content of the above cyan pigment is in a range of 0.1 to 1.0 wt % (based on the total amount of the ink compositions).

When a yellow pigment, a magenta pigment and a cyan pigment are used in the ink composition of the present invention, the weight ratios of the respective pigments are preferably 0.35 to 0.55, and more preferably 0.4 to 0.5, for the above yellow pigment, 0.25 to 0.45, and more preferably 0.3 to 0.4 for the above magenta pigment, and 0.1 to 0.3, and more preferably 0.15 to 0.25 for the cyan pigment, provided that the weight of all the pigments in the ink composition is 1.0, in order to maintain the realizability of the colors and prevent a grainy recorded image.

Moreover, the ink composition of the present invention preferably further includes a green pigment to improve the color reproducibility, particularly, the color reproducibility of a green region (ability to realize an image in a green region).

C. I. pigment green 7 and/or C. I. pigment green 36 are preferable as the above green pigment. Further, the preferred content of the above green pigment in the ink composition of the present invention is in a range of 0.01 to 2 wt %.

Moreover, the ink composition of the present invention preferably includes water, in addition to the above pigments.

Pigments are generally water-insoluble, and hence a dispersant such as a resin is also mixed into the ink, thus stably dispersing the pigment in the water.

The above yellow pigment, magenta pigment, cyan pigment and green pigment preferably used in the present invention can be dispersed stably in the water-based ink by suitably selecting the type and particle diameter of the pigment, the type of resin used, the dispersion means, and so on.

It is preferable that the pigment be added to the ink in the form of a pigment dispersion obtained by dispersing the pigment in a water-based solvent using a dispersant or a surfactant. A dispersant that is commonly used in the preparation of pigment dispersions, for example a macromolecular dispersant, is preferable.

Moreover, the ink composition of the present invention preferably contains an organic solvent. This organic solvent is preferably a low-boiling-point organic solvent; preferable examples thereof include methanol, ethanol, n-propanol, isopropanol, n-butanol, sec-butanol, tert-butanol, isobutanol and n-pentanol. In particular, a monohydric alcohol is preferable. The low-boiling-point organic solvent has an effect of reducing the drying time of the ink.

Moreover, the ink composition of the present invention preferably further contains a high-boiling-point organic solvent. Preferable examples of the high-boiling-point organic solvent include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane and trimethylolpropane, polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether; urea; 2-pyrrolidone; N-methyl-2-pyrrolidone; 1,3-dimethyl-2-imidazolidinone; and triethanolamine.

The amount added of the low-boiling-point organic solvent is preferably in a range of 0.5 to 10 wt %, more preferably 1.5 to 6 wt %, of the ink. Moreover, the amount added of the high-boiling-point organic solvent is preferably in a range of 0.5 to 40 wt %, more preferably 2 to 20 wt %, of the ink.

Moreover, the ink composition of the present invention can also contain other surfactants; examples of preferable surfactants include anionic surfactants (for example, sodium dodecylbenzene sulfonate, sodium laurate, ammonium polyoxyethylene alkyl ether sulfate etc.), and non-ionic surfactants (for example, polyoxyethylene alkyl ethers, polyoxyethylene alkyl esters, polyoxyethylene sorbitan fatty acid esters, polyoxyethylene alkyl phenyl ethers, polyoxyethylene alkyl amines, polyoxyethylene alkyl amides etc.). Such surfactants may either be used alone, or two or more types can be used mixed together. Moreover, an acetylenic glycol (Olfine Y, or Surfinol 82, 104, 440, 465 or 485 [all made by Shin-Etsu Chemical Co., Ltd.]) can also be used.

Moreover, the ink composition of the present invention preferably contains a resin emulsion. Here 'resin emulsion' means an emulsion in which the continuous phase is water, and the dispersed phase is a resin component such as an acrylic resin, a vinyl acetate resin, a styrene-butadiene resin, a vinyl chloride resin, an acrylic-styrene resin, a butadiene resin, a styrene resin, a crosslinked acrylic resin, a crosslinked styrene resin, a benzoguanamine resin, a phenol resin, a silicone resin, an epoxy resin or the like.

The resin is preferably a polymer that has both a hydrophilic part and a hydrophobic part. There are no particular limitations on the particle diameter of the resin component provided the emulsion can be formed, although it is preferable for the particle diameter to be not more than about 150 nm, and more preferably about 5 to 100 nm.

The resin emulsion can be obtained through dispersion polymerization of a resin monomer in water, in the presence of a surfactant as required. For example, an emulsion of an acrylic resin or a styrene-acrylic resin can be obtained by carrying out the dispersion polymerization of a (meth) acrylic acid ester, or a (meth)acrylic acid ester and styrene, in water in the presence of a surfactant. The mixing proportion of the resin component to the surfactant is usually preferably made to be in a range of about 10:1 to 5:1. If the amount of used surfactant is in this range, then an ink having better water resistance and penetrability can be obtained. There are no particular limitations on the surfactant, but preferable examples include the surfactants mentioned above.

Moreover, the appropriate proportion of the water to the resin that makes up the dispersed phase component, is in a range of 60 to 400, and preferably 100 to 200, parts by weight of water to 100 parts by weight of the resin.

A publicly known resin emulsion can also be used as the resin emulsion. For example, the resin emulsions disclosed in Japanese Patent Publication No. S62-1426, Japanese Patent Application Laid-open No. H3-56573, Japanese Patent Application Laid-open No. H3-79678, Japanese Patent Application Laid-open No. H3-160068 and Japanese Patent Application Laid-open No. H4-18462 can be used as is.

Moreover, a commercially available resin emulsion can be used; examples include Microgel E-1002 and E-5002 (styrene-acrylic resin emulsions made by Nippon Paint Co., Ltd.), Boncoat 4001 (an acrylic resin emulsion made by Dainippon Ink and Chemicals, Inc.), Boncoat 5454 (a styrene-acrylic resin emulsion made by Dainippon Ink and Chemicals, Inc.), SAE-1014 (a styrene-acrylic resin emulsion made by Nippon Zeon Co., Ltd.), and Sivynol SK-200 (an acrylic resin emulsion made by Saiden Chemical Industry Co., Ltd.).

The ink composition of the present invention preferably contains the resin emulsion in an amount such that the resin component of the resin emulsion accounts for 0.1 to 40 wt %, and more preferably 1 to 25 wt %, of the ink. The resin emulsion has an effect of suppressing the penetration of the colorant component, and thus promoting fixing of the colorant component to the recording medium. Moreover, depending on the type of resin emulsion, the resin emulsion may form a coating film on the surface of the ink image on the recording medium, thus improving the wear resistance of the printed article.

Moreover, the ink composition of the present invention preferably contains a thermoplastic resin in the form of a resin emulsion. Here, a 'thermoplastic resin' is a resin having a softening temperature of 50 to 250° C., preferably 60 to 200° C., where 'softening temperature' means the lowest temperature out of the glass transition temperature of the thermoplastic resin, the melting point of the thermoplastic resin, the temperature at which the coefficient of viscosity of the thermoplastic resin becomes 1011 to 1012 poise, and in the case that the thermoplastic resin is in the form of a resin emulsion, the minimum film formation temperature (MFT). In the heating step in the method according to the present invention, the recording medium is heated to a temperature above the softening temperature of the thermoplastic resin.

Moreover, it is preferable that the resin forms a strong, water-resistant, wear-resistant film upon heating above the softening or melting temperature and then cooling.

Examples of the thermoplastic resin are water-insoluble thermoplastic resins and low-molecular-weight thermoplastic resins.

Specific examples of water-insoluble thermoplastic resins include, but are not limited to, polyacrylic acid, polymethacrylic acid, polymethacrylic acid esters, polyethylacrylic acid, styrene-butadiene copolymers, polybutadiene, acrylonitrile-butadiene copolymers, chloroprene copolymers, fluororesins, polyvinylidene fluoride, polyolefin resins, cellulose, styrene-acrylic acid copolymers, styrene-methacrylic acid copolymers, polystyrene, styrene-acrylamide copolymers, polyisobutyl acrylate, polyacrylonitrile, polyvinyl acetate, polyvinyl acetal, polyamides, rosin type resins, polyethylene, polycarbonates, vinylidene chloride resins, cellulose type resins, vinyl acetate resins, ethylene-vinyl acetate copolymers, vinyl acetate-acrylic copolymers, vinyl chloride resins, polyurethanes, and rosin esters.

Specific examples of low-molecular-weight thermoplastic resins include a polyethylene wax, a montan wax, an alcohol wax, a synthetic oxidized wax, an α-olefin/maleic anhydride copolymer, animal/plant waxes such as carnauba wax, lanolin, paraffin wax, and microcrystalline wax.

The ink composition of the present invention may contain saccharides. Examples of saccharides include monosaccharides, disaccharides, oligosaccharides (including trisaccharides and tetrasaccharides) and polysaccharides, and preferable examples include glucose, mannose, fructose, ribose, xylose, arabinose, galactose, aldonic acid, glucitol, sorbit, maltose, cellobiose, lactose, sucrose, trehalose and maltotriose. Here, 'polysaccharides' is deemed to mean saccharides in the broad sense, including substances that exist widely in the natural world such as alginic acid, α-cyclodextrin and cellulose.

Moreover, derivatives of these saccharides include reducing sugars (for example, sugar alcohols [represented by the general formula $HOCH_2(CHOH)_nCH_2OH$ [where n is an integer from 2 to 5 inclusive]], oxidized sugars [for example, aldonic acid, uronic acid etc.], amino acids and thiosugars). Particularly preferable are sugar alcohols, specifically including maltitol and sorbit.

It is appropriate for the content of these saccharides to be in a range of 0.1 to 40 wt %, and preferably 0.5 to 30 wt %, of the ink.

In addition to the above, pH regulators, preservatives, fungicides and the like, may be added to the ink composition of the present invention as necessary.

Moreover, the present invention provides an ink set, which comprises the above ink composition of the present invention, in addition to a yellow ink, a magenta ink and a cyan ink. According to the ink set of the present invention, which comprises the above ink composition of the present invention, metamerizm can be reduced while the total amount of inks used is reduced, thus obtaining a vivid, high-quality image.

For a yellow ink, a magenta ink and a cyan ink, which are used in the ink set of the present invention, there are no limitations on the type, etc. of such inks and those used for a normal ink jet recording are used, unless the effect of the ink set relating to the present invention is impaired.

The ink set of the preset invention preferably further includes a black ink to obtain a good image through an ink jet output.

In addition to the inks described above, the ink set of the present invention may, as required, comprise a light magenta ink and a light cyan ink, prepared by lowering the concentrations of the colorants of a magenta ink and a cyan ink, respectively. Similarly, the ink set of the present invention may comprise a dark yellow ink obtained by adding small amounts of a magenta pigment and a cyan pigment to a yellow ink containing a yellow pigment. The ink set of the present invention may also comprise a green ink. Further, the ink set of the present invention may comprise an ink other than the above.

There are no particular limitations on the usage of the ink set of the present invention. However, in order to print high-resolution, high-quality images at high speed using a relatively inexpensive apparatus, the ink set of the present invention is suitable for use with ink jet recording, in which printing is carried out by making ink droplets fly onto a recording medium such as paper.

An image recorded using the ink set of the present invention uses: (1) a combination of a plurality of ink cartridges respectively and separately containing the above ink composition of the present invention, a yellow ink, a magenta ink, a cyan ink, and, as required, a black ink and other inks; (2) an ink cartridge integrally containing an ink set which comprises, at least, the ink composition of the present invention, and a yellow ink, a magenta ink and a cyan ink, and, as required, other inks; (3) a combination of the above integrated ink cartridge and a single cartridge containing a black ink; or the like.

The present invention provides: an ink cartridge containing, at least, the above ink composition of the present invention (e.g. a single cartridge containing only the above ink composition of the present invention) and an ink cartridge containing an ink set comprising, at least, the above ink composition, and a yellow ink, a magenta ink and a cyan ink and, as required, a black ink.

In the ink cartridge of the present invention, there are no particular limitations on the form of containing inks; however, particularly, an ink cartridge, which integrally contains an ink set comprising, at least, the above ink composition of the present invention, and a yellow ink, a magenta ink and a cyan ink, is preferable. There is an advantage of decreasing production (manufacture) costs in using this ink cartridge.

A specific example of the ink cartridge of the present invention is an ink cartridge for an ink jet recording device, which is separated into a plurality of containers by partition walls, is provided on a bottom surface of the containers with an ink supply port connected by inserting an ink supply needle that is penetrated into a recording head, and releases an ink into the above ink supply port from an ink outlet formed on the above ink container side, such ink cartridge being an integrated one which at least comprises containers in which the ink composition of the present invention, and an yellow ink, a magenta ink and a cyan ink are respectively filled, and, as required, further comprises one or more ink containers in which another or more ink is filled. Further, in the case of an intergraded ink cartridge as above, it is possible to use it, as required, in combination with a single ink cartridge containing a black ink, rather than to use it by containing a black ink in itself.

Further, by forming an image on a recording medium through a recording method using the ink set of the present invention and an ink set using the same, metamerizm can be reduced while the total amount of inks used is reduced, thus obtaining a vivid, high-quality image.

An example of recording methods using the ink composition of the present invention and an ink set using the same is a method of forming an image by an ink jet recording device or any other recording system which comprises a plurality of ink cartridges separately containing the ink composition of the present invention and other ink compositions or an integrated ink cartridge integrally containing these ink compositions; and a printer head discharging from the above ink cartridge the inks in an ink set including the ink composition of the present invention.

Moreover, a recorded article, comprising a recording medium having an vivid high-quality image formed thereon with reduced metamerizm, can be obtained by using the ink composition of the present invention and an ink set using the same.

The further details of the present invention will be explained with reference to the examples below. However, the present invention will not be limited in any way by these examples.

An ink composition was prepared following the configuration below (hereinafter referred to as 'grey ink 1') was prepared.

| (Unit: wt %) | |
|---|---|
| C.I. pigment red 122 | 1.1 |
| C.I. pigment blue 15:3 | 0.6 |
| C.I. pigment yellow 110 | 1.4 |
| Ammonium salt of styrene-acrylic copolymer (molecular weight 7000, dispersant/solid content) | 1.5 |
| Glycerol | 15.0 |
| Ethylene glycol | 5.0 |
| Triethylene glycol monobutyl ether | 5.0 |
| Triethanolamine | 0.9 |
| 2-pyrrolidone | 3.0 |
| Surfinol 465 (made by Shin-Etsu Chemical Co., Ltd.) | 1.0 |
| Ion-exchange water | Remainder |

A print evaluation test was conducted using an ink set consisting of seven colors: the above grey ink 1, a black ink, a cyan ink, a magenta ink, a yellow ink, a light cyan ink, and a light magenta ink. That is, first, using an Ink Jet Printer MC 2000 (made by Seiko Epson Corporation), in which an ink cartridge filled with the grey ink 1 was mounted, only the portion of the grey ink being used was printed on MC photographic paper (made by Seiko Epson Corporation). For this printing, a printer driver for the grey ink was prepared and used. Next, the remaining portion was printed on this printed article, using the above printer, in which a cartridge for an MC 2000 was mounted, thus forming a color image.

Moreover, the color of a solid pattern printed on MC photographic paper using only a grey ink was measured by a 938 Spectrodensitometer (made by X-rite) under duty 50% (with a D50 light source) and the spectral characteristics of reflected light thereof were thus investigated. As a result, it was found that a graph showing a reflectance over a wavelength range of 400 to 700 nm forms a fairly flat spectral curve (see FIG. 1). The difference between the maximum value and the minimum value of a reflectance over this wavelength range, as shown in FIG. 1, was approximately 13. The color value of this output pattern (L*, a*, b*) was (52.07, −1.65, −0.12).

EVALUATION TESTS

A graduation pattern from red (R), green (G), blue (B), cyan, magenta, yellow to black was printed using an ink set consisting of the aforementioned seven colors. Using this output pattern, various evaluations as shown below were conducted:

Evaluation Test 1 (Evaluation of Reduction of Metamerizm)

An outputted printed article was held up to a fluorescent lamp and sunlight, and the changes in the colors thereof were evaluated visually. As a result, in the case where the ink set of the present invention was used, no great difference was found in the appearance of the colors between the light sources (i.e. metamerizm was reduced.)

Evaluation Test 2 (Evaluation of Image Quality in Terms of Graininess)

Next, print patterns obtained by the ink set of this example were imported (i.e. scanned) into an input device as image data on the following conditions:

Scanner: DT-S1045AI (made by Dainippon Screen MFG Co., Ltd.)

Resolution: 1300 dpi

Region to be analyzed: 512×512 pixel (10×10 mm)

Next, the scanned image data was shown in the space L* a* b*, the image of component L* was subject to a two-dimensional fast Fourier transformation and thereafter transformed into a curve coordinate system and made into one dimension to obtain a WS(u), which is a winner spectrum of an image. This test was carried out in reference to "Noise Evaluation Method of Half-Tone Color Image" by Mr. Imagawa and others (Collected papers of Hardcopy '96, pages 189–192, 1996).

VTF(u) showing the spatial frequency characteristic of the sight was obtained using the following formula (1), on the presumption that 300 mm is 1 distance of distinct vision:

$$VTF(u)=5.05 \exp(-0.138\pi lu/180)(1-\exp(-0.1\pi lu/180)), \quad (1)$$

The graininess index was finally calculated from the WS(u) and the VTF (u) by undermentioned formula (2), and the graininess in each case was evaluated:

$$(\text{Graininess index})=a(L^*)\int (WS(u))^{0.5} VTF(u) du \quad (2)$$

Here, formula (3) below was used for a(L*), which shows an adjusted brightness in formula (2) above. Formula (3) is very simple in that only component L* is used. However, it is also quite unique in that a high correlation coefficient of 0.95 was obtained relative to the results of the subjective evaluation tests using grey patches with the respective brightness levels of eight kinds of ink jet printers and a Pictrography.

$$a(L^*) = ((L^* + 16)/116)^{0.8} \quad (3)$$

According to the above, the respective graininess index was obtained on print patterns for each of the above hues. Moreover, the graininess index for the print pattern of the hues in the control case (in which a grey ink 1 was excluded from the above ink set, i.e., an ink set consisting of a black ink, a cyan ink, a magenta ink, a yellow ink, a light cyan ink and a light magenta ink) was also obtained. Thus values of the above graininess indexes were obtained based on the presumption that the graininess index of the MC 200 Original (outputted by a printer driver for an MC 2000 using an MC 2000) is 0.1. The value obtained was judged on the criteria below. In a gradation pattern, a portion of L*=30 (a portion of L*=15 for a blue ink only) was used as a point of comparison. The smaller graininess index shows a less granular and higher-quality image.

| Evaluation A: | Less than 0.7 |
| Evaluation B: | No less than 0.7 and less than 1.0 |
| Evaluation C: | No less than 1.0 |

The results of the evaluations were A in all of the print patterns.

Evaluation Test 3 (Evaluation of Color Reproducibility)

Using the above ink set including a grey ink 1, a patch pattern including various kinds of hues which were uniformed into a predetermined value L*, was printed in accordance with the above example, the colors of the patch pattern were measured to obtain values a* and b*, thus obtaining color reproducibility at the predetermined value L*. The colors of the printed article were measured using the above "938 Spectrodensitometer" (made by X-rite). Specifically, values a* and b*, when value L* is 30, 40 or 50 and the color reproduction area of an MC original (which is outputted by a printer driver for a MC 2000C using a MC 2000C) is 100%, were obtained to evaluate the color reproducibility from the results obtained as follows:

| Evaluation A: | Color reproduction area exceeds 105% |
| Evaluation B: | Color reproduction area is no less than 100% and no more than 105% |
| Evaluation C: | Color reproduction area is less than 100% |

The evaluation results were A, regardless of any value L*.

The present invention provides an ink composition, which can reduce matamerizm, while reducing the total amount of inks used when simultaneously used with another ink composition, and prevent reduction of the image quality.

What is claimed is:

1. An ink composition comprising, at least, a yellow pigment, a magenta pigment and a cyan pigment, wherein said yellow pigment is a pigment (I) shown by a formula (I) below; said magenta pigment is a pigment (II) shown by a formula (II) below; and said cyan pigment is a pigment (III) shown by a formula (III) below:

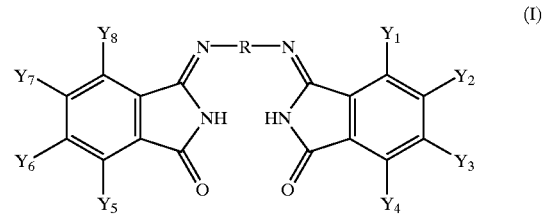

wherein $Y_1$ through $Y_8$ independently represent a chlorine atom or a hydrogen atom, and R represents o-phenylene or 2,6-xylyl;

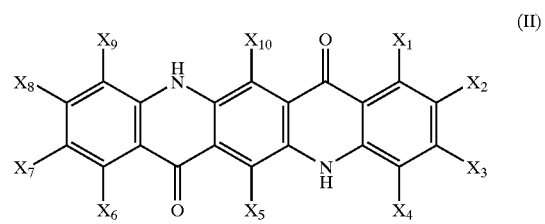

wherein $X_1$ through $X_{10}$ independently represent a chlorine atom, a hydrogen atom or a methyl group;

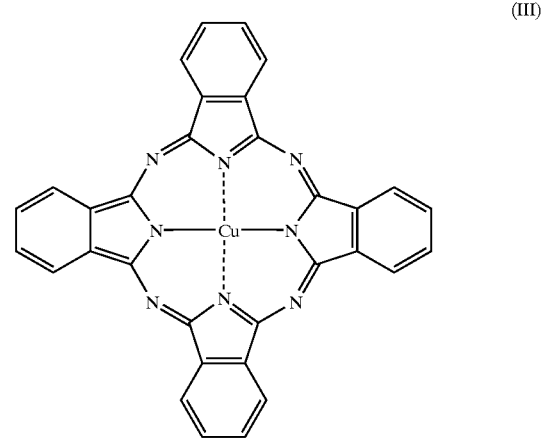

wherein the difference between the maximum value and the minimum value of the reflectance of an output color through an ink jet output over a light source wavelength range of 400 to 700 nm, in which said output color satisfies formulae (1), (2) and (3) below in spatial coordinates (L*, a*, b*) stipulated by the CIE (Commission International del'Eclairage) under a D50 light source, is not more than 20%:

(1) $45 \leq L^* \leq 55$
(2) $-10 < a^* < 10$
(3) $-10 < b^* < 10$.

2. An ink composition according to claim 1, wherein said pigment (I) is C. I Pigment Yellow 110; said pigment (II) is C. I. Pigment Red 122; and said pigment (III) is C. I. Pigment Blue 15:3.

3. An ink composition according to claim 2, wherein the content of said yellow pigment is in a range of 0.01 to 2.0 wt %; the content of said magenta pigment is in a range of 0.01 to 2 wt %; and the content of said cyan pigment is in a range of 0.001 to 1.5 wt %.

4. An ink composition according to claim 3, wherein the content of said yellow pigment is more than 1.0 wt %, and no more than 1.5 wt %; the content of said magenta pigment is more than 1.0 wt %, and no more than 1.5 wt %; and the content of said cyan pigment is in a range of 0.1 to 1.0 wt %.

5. An ink composition according to claim 2, wherein the weight ratios of pigments in said ink composition are in a range of 0.35 to 0.55 for said yellow pigment; 0.25 to 0.45 for said magenta pigment; and 0.1 to 0.3 for said cyan pigment, provided that the weight of all of said pigments in said ink composition is 1.0.

6. An ink set, comprising at least an ink composition according to claim 2, in addition to a yellow ink, a magenta ink and a cyan ink.

7. An ink set according to claim 6, further comprising a black ink.

8. An ink cartridge, comprising an ink composition according to claim 2.

9. A recording method, comprising the step of forming an image on a recording medium using an ink composition according to claim 2.

10. A recorded article, comprising a recording medium having an image formed thereon using an ink composition according to claim 2.

11. An ink composition according to claim 1, wherein the content of said yellow pigment is in a range of 0.01 to 2.0 wt %; the content of said magenta pigment is in a range of 0.01 to 2 wt %; and the content of said cyan pigment is in a range of 0.001 to 1.5 wt %.

12. An ink composition according to claim 11, wherein the content of said yellow pigment is more than 1.0 wt %, and no more than 1.5 wt %; the content of said magenta pigment is more than 1.0 wt %, and no more than 1.5 wt %; and the content of said cyan pigment is in a range of 0.1 to 1.0 wt %.

13. An ink composition according to claim 1, wherein the weight ratios of pigments in said ink composition are in a range of 0.35 to 0.55 for said yellow pigment; 0.25 to 0.45 for said magenta pigment; and 0.1 to 0.3 for said cyan pigment, provided that the weight of all of said pigments in said ink composition is 1.0.

14. An ink set, comprising at least an ink composition according to claim 1, in addition to a yellow ink, a magenta ink and a cyan ink.

15. An ink set according to claim 14, further comprising a black ink.

16. An ink cartridge, comprising an ink composition according to claim 1.

17. A recording method, comprising the step of forming an image on a recording medium using an ink composition according to claim 1.

18. A recorded article, comprising a recording medium having an image formed thereon using an ink composition according to claim 1.

* * * * *